(12) United States Patent
Poole et al.

(10) Patent No.: US 11,199,929 B2
(45) Date of Patent: Dec. 14, 2021

(54) ANTIREFLECTIVE TREATMENT FOR TEXTURED ENCLOSURE COMPONENTS

(71) Applicant: Apple Inc., Cupertino, CA (US)

(72) Inventors: Joseph C. Poole, Hayward, CA (US); Matthew S. Rogers, San Jose, CA (US); Naoto Matsuyuki, Kasugai (JP)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/506,887

(22) Filed: Jul. 9, 2019

(65) Prior Publication Data

US 2020/0301527 A1 Sep. 24, 2020

Related U.S. Application Data

(60) Provisional application No. 62/821,872, filed on Mar. 21, 2019.

(51) Int. Cl.
| | |
|---|---|
| *G06F 3/042* | (2006.01) |
| *H04M 1/02* | (2006.01) |
| *G02B 13/00* | (2006.01) |
| *G06F 1/16* | (2006.01) |
| *G02B 5/02* | (2006.01) |
| *C03C 17/00* | (2006.01) |
| *C03C 15/00* | (2006.01) |

(52) U.S. Cl.
CPC .......... *G06F 3/042* (2013.01); *G02B 5/0294* (2013.01); *G02B 13/0085* (2013.01); *G06F 1/1637* (2013.01); *H04M 1/0266* (2013.01); *C03C 15/00* (2013.01); *C03C 17/001* (2013.01)

(58) Field of Classification Search
CPC ..... G06F 3/042; G06F 1/1637; G02B 5/0294; G02B 13/0085; H04M 1/0266; C03C 15/00; C03C 17/001
See application file for complete search history.

(56) References Cited

U.S. PATENT DOCUMENTS

| | | | |
|---|---|---|---|
| 4,633,323 A | 12/1986 | Haberkern et al. | |
| 6,068,891 A * | 5/2000 | O'Dell | ................ C03C 23/0025 360/135 |
| 6,677,703 B2 | 1/2004 | Ito et al. | |
| 7,297,386 B2 | 11/2007 | Suzuki et al. | |
| 7,646,143 B2 | 1/2010 | Kimura et al. | |
| 8,092,911 B2 | 1/2012 | Sakoske et al. | |
| 8,106,787 B2 | 1/2012 | Nurmi | |

(Continued)

FOREIGN PATENT DOCUMENTS

| | | |
|---|---|---|
| CN | 203013800 | 6/2013 |
| CN | 203406929 | 1/2014 |

(Continued)

OTHER PUBLICATIONS

U.S. Appl. No. 16/268,338, filed Feb. 5, 2019, pending.

(Continued)

*Primary Examiner* — Christopher E Leiby
(74) *Attorney, Agent, or Firm* — Brownstein Hyatt Farber Schreck, LLP

(57) ABSTRACT

A textured enclosure component including two different types of surface features is disclosed. The two different types of surface features are differently sized. The combination of differently sized surface features provides both anti-glare and anti-reflective properties to the enclosure component.

20 Claims, 14 Drawing Sheets

(56) References Cited

U.S. PATENT DOCUMENTS

| | | |
|---|---|---|
| 8,213,085 B2 | 7/2012 | Liu et al. |
| 8,553,333 B2 | 10/2013 | Chang et al. |
| 8,576,561 B2 | 11/2013 | Myers et al. |
| 8,603,372 B2 | 12/2013 | Tanaka et al. |
| 8,681,113 B1 | 3/2014 | Wu et al. |
| 8,771,532 B2 | 7/2014 | Carlson et al. |
| 8,953,083 B2 | 2/2015 | Hedge |
| 9,017,566 B2 | 4/2015 | Lander et al. |
| 9,034,166 B2 | 5/2015 | Tatebe et al. |
| 9,154,678 B2 | 10/2015 | Kwong et al. |
| 9,239,594 B2 | 1/2016 | Lee et al. |
| 9,240,498 B2 | 1/2016 | Fujita et al. |
| 9,262,002 B2 | 2/2016 | Momeyer et al. |
| 9,377,603 B1 | 6/2016 | Cheng et al. |
| 9,448,713 B2 | 9/2016 | Cruz-Hernandez et al. |
| 9,644,281 B2 | 5/2017 | Tatebe et al. |
| 9,658,500 B2 | 5/2017 | Iwamoto |
| 9,732,237 B2 | 8/2017 | Sugamoto et al. |
| 9,745,221 B2 | 8/2017 | Ehrensperger et al. |
| 9,862,124 B2 | 1/2018 | Radcliffe et al. |
| 9,880,327 B2 | 1/2018 | Park et al. |
| 9,938,186 B2 | 4/2018 | Moll et al. |
| 9,961,337 B2 | 5/2018 | Stroetmann |
| 10,013,020 B2 | 7/2018 | Hong et al. |
| 10,043,052 B2 | 8/2018 | Wickboldt et al. |
| 10,171,636 B2 | 1/2019 | Yeo et al. |
| 10,214,445 B2 | 2/2019 | Hart et al. |
| 10,298,824 B2 | 5/2019 | Lee et al. |
| 10,442,151 B2 | 10/2019 | Ozeki et al. |
| 10,647,032 B2 | 5/2020 | Radcliffe et al. |
| 10,676,393 B2 | 6/2020 | Weber et al. |
| 10,827,635 B1 | 11/2020 | Limarga et al. |
| 10,866,616 B2 | 12/2020 | Seo et al. |
| 10,948,633 B2 | 3/2021 | Murakami et al. |
| 2002/0127565 A1 | 9/2002 | Cunningham |
| 2003/0011315 A1 | 1/2003 | Ito et al. |
| 2005/0266250 A1* | 12/2005 | Hayakawa .......... C23C 14/0605 428/421 |
| 2006/0024508 A1* | 2/2006 | D'Urso .................. B08B 17/065 428/426 |
| 2006/0034042 A1 | 2/2006 | Hisano et al. |
| 2007/0195419 A1 | 8/2007 | Tsuda et al. |
| 2009/0257207 A1* | 10/2009 | Wang ..................... G06F 1/1637 361/752 |
| 2012/0127755 A1 | 5/2012 | Shiau et al. |
| 2012/0194974 A1 | 8/2012 | Weber et al. |
| 2012/0218640 A1 | 8/2012 | Gollier et al. |
| 2012/0274565 A1 | 11/2012 | Moser et al. |
| 2013/0026593 A1 | 1/2013 | Hermans et al. |
| 2013/0235462 A1 | 9/2013 | Haas |
| 2013/0273324 A1 | 10/2013 | Moll et al. |
| 2014/0035869 A1 | 2/2014 | Yun et al. |
| 2014/0063609 A1 | 3/2014 | Iwata et al. |
| 2014/0098075 A1 | 4/2014 | Kwak et al. |
| 2014/0106127 A1* | 4/2014 | Lyons ...................... C09D 7/67 428/143 |
| 2014/0327643 A1 | 11/2014 | Sun et al. |
| 2015/0090689 A1 | 4/2015 | Guilfoyle et al. |
| 2016/0224822 A1 | 8/2016 | Hasegawa et al. |
| 2016/0283014 A1 | 9/2016 | Rider et al. |
| 2017/0026553 A1 | 1/2017 | Lee et al. |
| 2017/0058130 A1* | 3/2017 | Addleman ............... B05D 1/12 |
| 2017/0276618 A1 | 9/2017 | Takagi |
| 2017/0308234 A1 | 10/2017 | Li et al. |
| 2018/0042131 A1 | 2/2018 | Liu et al. |
| 2018/0086662 A1 | 3/2018 | Luzzato et al. |
| 2018/0162091 A1 | 6/2018 | Takeda et al. |
| 2018/0162768 A1 | 6/2018 | Boek et al. |
| 2018/0215657 A1 | 8/2018 | Jin et al. |
| 2018/0282201 A1* | 10/2018 | Hancock, Jr. ........... C03C 3/091 |
| 2019/0032237 A1 | 1/2019 | Kim et al. |
| 2019/0037690 A1 | 1/2019 | Wilson et al. |
| 2019/0155339 A1 | 5/2019 | Fenton et al. |
| 2019/0230204 A1 | 7/2019 | Zhang |
| 2019/0236887 A1 | 8/2019 | Rich et al. |
| 2019/0241455 A1 | 8/2019 | Sweney et al. |
| 2019/0246018 A1 | 8/2019 | Rho et al. |
| 2019/0331940 A1 | 10/2019 | Poole et al. |
| 2020/0014780 A1 | 1/2020 | Jones |
| 2020/0026327 A1 | 1/2020 | Hendren et al. |
| 2020/0189966 A1* | 6/2020 | Lee ........................ C03C 15/00 |
| 2020/0199020 A1 | 6/2020 | Hatano et al. |
| 2020/0304616 A1 | 9/2020 | Jones |
| 2020/0379143 A1 | 12/2020 | Gu et al. |
| 2020/0385307 A1 | 12/2020 | Li et al. |
| 2020/0389991 A1 | 12/2020 | Shannon et al. |
| 2021/0014992 A1 | 1/2021 | Limarga et al. |

FOREIGN PATENT DOCUMENTS

| | | |
|---|---|---|
| CN | 207070526 | 3/2018 |
| CN | 107911964 | 4/2018 |
| CN | 207992872 | 10/2018 |
| CN | 208433428 | 1/2019 |
| CN | 208461858 | 2/2019 |
| CN | 109640557 | 4/2019 |
| DE | 10223165 | 12/2003 |
| EP | 3454541 | 3/2019 |
| JP | 2011510904 | 4/2011 |
| JP | 2013242725 | 12/2013 |
| JP | 2016045824 | 4/2016 |
| JP | 2017508178 | 3/2017 |
| JP | 2018506851 | 3/2018 |
| KR | 20130127842 | 11/2013 |
| KR | 20160145081 | 12/2016 |
| TW | 201910882 | 3/2019 |
| WO | WO2014/011328 | 1/2014 |
| WO | WO2014/012003 | 1/2014 |
| WO | WO2015/191949 | 12/2015 |
| WO | WO2019/027675 | 2/2019 |

OTHER PUBLICATIONS

U.S. Appl. No. 16/401,004, filed May 1, 2019, pending.

U.S. Appl. No. 16/425,741, filed May 29, 2019, pending.

Author Unknown, "LG's Future Display Technology Will Blow You Away," Techno Source, https://www.youtube.com/watch?v=qlRjytgNuhM, 2 pages, May 2, 2017.

Ben-Yakar et al., "Femtosecond laser ablation properties of borosilicate glass," Journal of Applied Physics, vol. 96, No. 9, 8 pages, Nov. 1, 2004.

Seth, Radhika, "A Fresh New Look at the Computer," https://www.yankodesign.com/2009/02/06/a-fresh-new-look-at-the-computer, 1 page, Feb. 6, 2009.

Hedayati et al., Antireflective Coatings: Conventional Stacking Layers and Ultrathin Plasmonic Metasurfaces, A Mini-Review, Materials, vol. 9, No. 497, 2016.

Qi et al., "Simple Approach to Wafer-Scale Self-Cleaning Antireflective Silicon Surfaces," American Chemical Society, State Key Laboratory of Supramolecular Structure and Materials, College of Chemistry, Jilin University, Changchun 130012, P.R. China, 2009.

Tan et al., "Broadband antireflection film with moth-eye-like structure for flexible display applications," Optica, vol. 4, No. 7, pp. 678-683, Jul. 2017.

U.S. Appl. No. 16/564,244, filed Sep. 9, 2019, pending.

U.S. Appl. No. 16/564,325, filed Sep. 9, 2019, pending.

U.S. Appl. No. 16/564,568, filed Sep. 9, 2019, pending.

U.S. Appl. No. 16/659,173, filed Oct. 21, 2019, pending.

Wimmer, "Curve: Revisiting the Digital Desk," NordiCHI '10: Proceedings of the 6th Nordic Conference on Human-Computer Interaction: Extending Boundaries, https://doi.org/10.1145/1868914.1868977, http://www.mmi.ifi.lmu.de/pubdb/publications/pub/wimmer2010Curve/wimmer2010Curve.pdf, https://dl.acm.org/doi/10.1145/1868914.1868977, pp. 561-570, Oct. 2010.

\* cited by examiner

ANTIREFLECTIVE TREATMENT FOR TEXTURED ENCLOSURE COMPONENTS

CROSS-REFERENCE TO RELATED APPLICATION(S)

This application is a non-provisional patent application of and claims the benefit of U.S. Provisional Patent Application 62/821,872, filed Mar. 21, 2019 and titled "Antireflective Treatment for Textured Glass," the disclosure of which is hereby incorporated by reference in its entirety.

FIELD

The described embodiments relate generally to textured enclosure components for electronic devices. More particularly, the present embodiments relate to forming a texture including at least two different sizes of surface features on the enclosure component.

BACKGROUND

Electronic devices may include a glass cover over a display, camera, or other device component. For some electronic devices, the glass cover may be treated to reduce reflections and/or glare from lighting sources external to the electronic device or to otherwise tune the optical properties of the glass cover. In some cases, different types of treatments may be required in order to produce anti-glare properties and anti-reflective properties.

SUMMARY

Aspects described herein relate to a textured enclosure component for an electronic device which includes two different types of surface features, the two different types of surface features being differently sized. The combination of differently sized surface features may provide both anti-glare and anti-reflective properties to the enclosure component. In embodiments, smaller surface features are distributed along larger surface features.

By the way of example, the enclosure component may be a cover, an input structure, or other form of enclosure component. The enclosure component may comprise a glass member such as a glass cover member. In embodiments, at least a portion of the enclosure component is transparent to light in the visible spectrum.

In some embodiments, an electronic device comprises a housing member at least partially defining an internal volume of the electronic device, a display at least partially within the internal volume, a display at least partially within the internal volume, and a glass cover. The glass cover is positioned over the display, coupled to the housing member, and defines a set of micro-scale features formed on the glass cover and a set of nano-scale features formed on the set of micro-scale features.

In further embodiments, the glass cover defines a transparent region positioned over the display. The set of micro-scale features may be formed along the transparent region and the transparent region may define a touch-sensitive input surface of the electronic device.

In some embodiments, an electronic device comprises a housing component, a glass member coupled to the housing component and comprising a textured region, and a display coupled to the glass member and configured to display graphical outputs that are visible through the textured region of the glass member. The textured region defines a substrate surface, a set of protrusions extending outwardly from the substrate surface, each protrusion of the set of protrusions having a width greater than or equal to about 750 nm and less than about 10 microns, and a set of recesses distributed over the set of protrusions and the substrate surface, each recess of the set of recesses having a width from about 5 nm to about 200 nm.

In some embodiments, a mobile phone comprises a display and an enclosure at least partially surrounding the display, having an exterior surface, and comprising a glass member. The glass member defines, along the exterior surface, a set of micro-scale protrusions extending from a substrate surface of the glass member, each micro-scale protrusion of the set of micro-scale protrusions defining a base having a width, a peak having a height above the substrate surface, and an inclined surface side extending from the base to the peak. The glass member further defines nano-scale features distributed along the inclined surface of each of the set of micro-scale features.

BRIEF DESCRIPTION OF THE DRAWINGS

The disclosure will be readily understood by the following detailed description in conjunction with the accompanying drawings, wherein like reference numerals designate like elements.

Figure 1A:
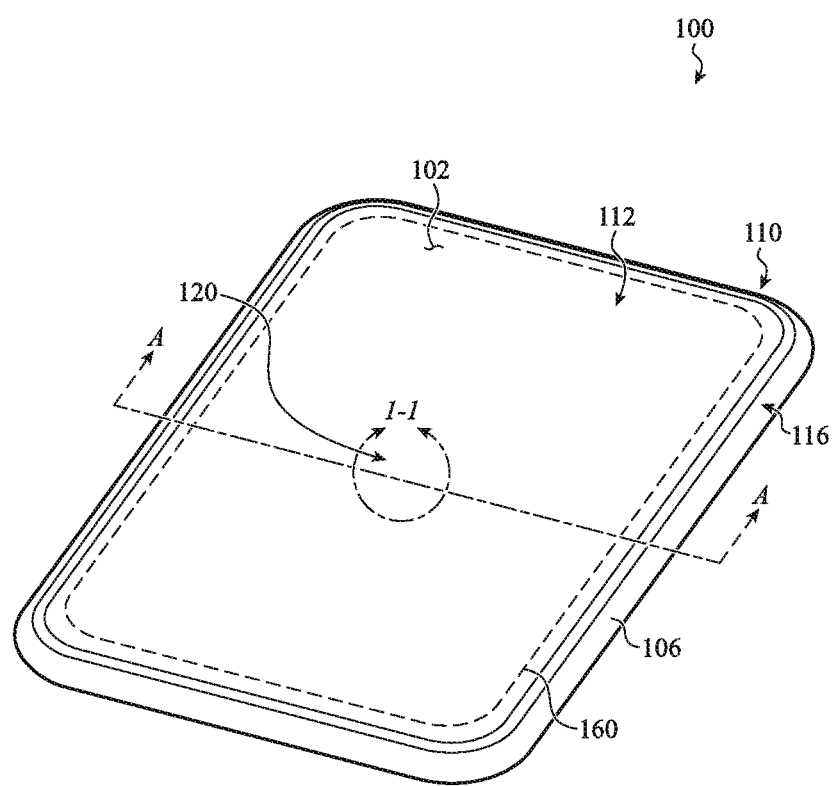
FIG. 1A shows a front view of an example electronic device including a textured enclosure component.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following descriptions are not intended to limit the embodiments to one preferred implementation. To the contrary, the described embodiments are intended to cover alternatives, modifications, and equivalents as can be included within the spirit and scope of the disclosure and as defined by the appended claims.

The following disclosure relates to textured enclosure components and electronic devices including such enclosure components. For example, the textured enclosure component may be a cover, an input structure, a camera or sensor window, or the like. The textured enclosure component may have a transparent region.

Electronic devices may benefit from certain optical properties, such as anti-reflective properties and anti-glare properties. Conventional treatments to provide anti-reflective properties may include forming a single layer coating over the transparent region (e.g., a quarter-wavelength coating). However, single layer coatings may reduce reflectivity only for a limited range of wavelengths and incidence angles. Multi-layer coatings can be used to increase the wavelength range, but require additional processing steps. Conventional treatments to provide anti-glare properties may include texturing of the surface of the transparent region.

Aspects of the disclosure relate to enclosure components having a dual-textured surface that provides both anti-reflective and anti-glare properties along at least a portion of the exterior surface of the electronic device. For example, the enclosure component may include a first texture defined by first surface features and a second texture defined by second surface features. The two types of surface features are differently sized and can provide different optical properties to the enclosure component. The enclosure component may comprise a glass member and the first texture and the second texture may be formed into and/or on the glass member.

Enclosure components having the optical properties described herein may define first surface features and second surface features, with the first surface features having a larger size than the second surface features and the second surface features located along the first surface features (e.g., the smaller features are located on the surfaces of the larger first surface features, as well as between the first surface features). In embodiments, the first surface features are configured to provide an anti-glare property and the second surface features are configured to provide an anti-reflective property. For example, the second surface features (e.g., nano-scale recesses along the glass surface) may provide an effective index of refraction that reduces the amount of light reflected from the surface. At the same time, the first surface features (e.g., raised features adding a surface roughness) may diffuse or scatter light reflected from the surface of the enclosure component, reducing glare and improving the ability to see through the enclosure component under certain lighting conditions. The combination of differently sized surface features may provide both anti-glare and anti-reflective properties to the enclosure component, and may eliminate the need for conventional anti-reflective treatments such as coatings or films that may reduce reflectivity for more limited ranges of wavelengths and incidence angles.

As previously discussed, the first surface features, which may be a first set of features, may provide an anti-glare property to the enclosure member. For example, the surface features may diffuse or scatter light reflected from an external lighting source. As a result, a reflected image from an enclosure component including the first surface features may have a coherency less than that of an enclosure component without these features. Further, the ambient contrast ratio may be increased relative to that of an enclosure component without these features. In embodiments, the anti-glare effect provided by the first surface features does not unduly reduce the distinctness of image (DOI).

In addition, the second surface features, which may be a second set of features, may provide an anti-reflection property to the enclosure member. By the way of example, the second surface features may provide a broadband anti-reflection property over the spectrum of visible light. The second surface features may be configured to provide an effective index of refraction or configured to provide a graded refractive index (GRIN) structure. As a result, the amount of light reflected from an enclosure component that includes the second set of features may be less than that of an enclosure component without these features, thereby improving optical performance of the treated enclosure component. Similarly, the amount of light transmitted through the treated enclosure component may be greater than that of an enclosure component without these features.

As described herein, the shapes and/or sizes of the first surface features and the second surface features may differ from one another. In embodiments, the enclosure component defines a substrate surface and the first surface features have the form of protrusions which extend outwardly from the substrate surface. The second surface features may be distributed along the first surface features and may take the form of recesses, projections, and so forth. In embodiments, the first surface features may be referred to as a first set of surface features and/or the second set of surface features may be referred to as a second set of surface features.

The first surface features may have a size greater than the longest wavelength of visible light (e.g., greater than about 750 nm). The first surface features may be micro-scale features. As used herein, micro-scale may refer to sizes from about 1 micron to about 1 mm (typically less than 1 mm). The first surface features may have a width from about 750 nm to less than about 25 microns, greater than or equal to about 750 nm and less than about 10 microns, from about 1 micron to about 25 microns, from about 1 micron to about 10 microns, or from about 1 micron to about 5 microns. The first surface features may have a height from about 200 nm to about 2 microns, from about 200 nm to about 1 micron, or from about 500 nm to about 5 microns. In further embodiments, each of the first surface features has a width less than a pixel size of a display or a sensor underlying the cover to limit distortion of the pixels as viewed through the enclosure component. The first surface features may also be described by an average width and an average height (or a median or mean width or height), with the average width falling within these width ranges and/or the average height falling within these height ranges. Further, the first surface features may define a surface roughness.

The second surface features may have a size less than the shortest wavelength of visible light (e.g., less than about 380 nm). In some cases, the second surface features are nano-scale features. As used herein, nano-scale may refer to sizes from about 1 nm to about 1 micron (typically less than 1 micron). The second surface features may have a width from about 5 nm to about 200 nm, from about 5 nm to about 100 nm, from about 5 nm to about 50 nm, or from about 5 nm to about 25 nm. The second surface features may have a depth from about 5 nm to about 100 nm, from about 5 nm to about 50 nm, or from about 5 nm to about 25 nm. The second surface features may also be described by an average width and an average height (or a median or mean width or height). Further, the second surface features may define a surface roughness.

Also described herein are processes for making textured enclosure components. An example of such a process may comprise an operation of forming the first surface features on the enclosure component and an operation of forming the second surface features on the enclosure component. The process may optionally include an operation of chemically strengthening the enclosure component and/or an operation of applying an oleophobic coating to a least a portion of the first surface features and the second surface features.

These and other embodiments are discussed below with reference to FIGS. 1A-13. However, those skilled in the art will readily appreciate that the detailed description given herein with respect to these figures is for explanatory purposes only and should not be construed as limiting.

FIG. 1A shows a front view of an electronic device 100. The electronic device 100 defines a front surface 102 and a side surface 106. The electronic device 100 includes an enclosure 110, which includes an enclosure component 112. As shown in FIG. 1A, the front surface 102 is defined, at least in part, by the enclosure component 112. For example, the enclosure component 112 may be a cover, an input structure, a window, and so on.

Figure 3:
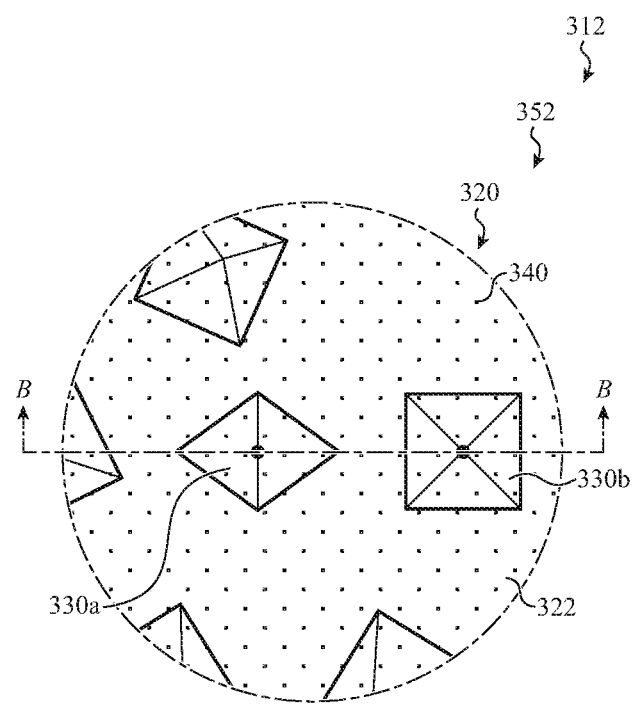
FIG. 3 shows a detail view of an example textured enclosure component.
Figure 6:
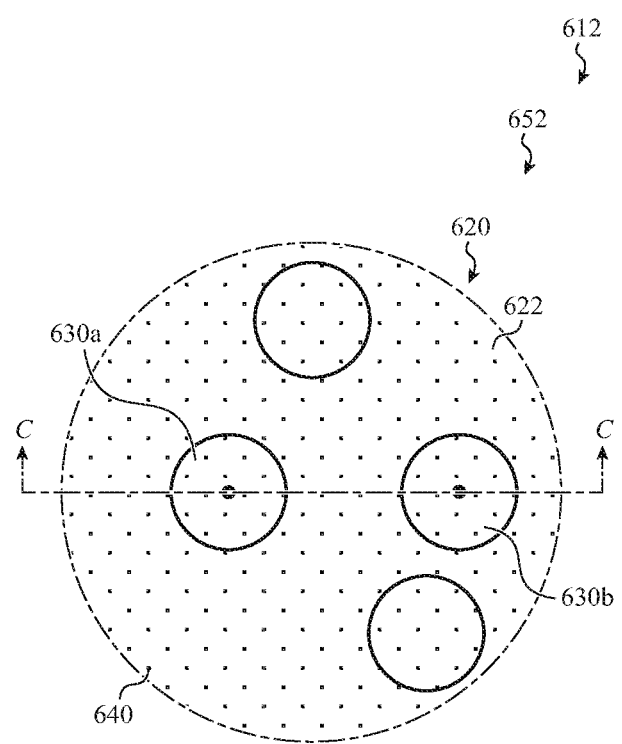
FIG. 6 shows a detail view of another example textured enclosure component.

The enclosure component 112 may define a textured region 120. For example, the textured region 120 may extend over a front surface of the enclosure component 112 or a window portion of the enclosure component 112. FIGS. 3 and 6 provide examples of surface textures within Detail 1-1, which is located within textured region 120.

The electronic device 100 further includes a display 160. The display 160 is positioned below the enclosure component 112 and is indicated by a dashed line. The textured region 120 of the enclosure component 112 may extend over the display 160. The textured region 120 may be transparent to light in the visible spectrum.

In embodiments, the enclosure component 112 may form part or all of the enclosure 110. In embodiments, the enclosure 110 may include both a front and a rear cover (e.g., one or both of which may be formed of or include glass), with each being separate enclosure components. In further embodiments, the enclosure component 112 may be a single monolithic component (e.g., a single piece of glass) which defines a back cover and a housing or a front cover, a back cover, and a housing. In some cases, the enclosure component 112 may define substantially the entire front surface of a device as well as a portion (or all) of a surrounding sidewall or side of the device. The enclosure component 112 may also define substantially the entire rear surface of the device as well as a portion (or all) of a surrounding sidewall or side of the device. Likewise, the enclosure component 112 may define front, rear, and sides of a device.

Figure 1B:
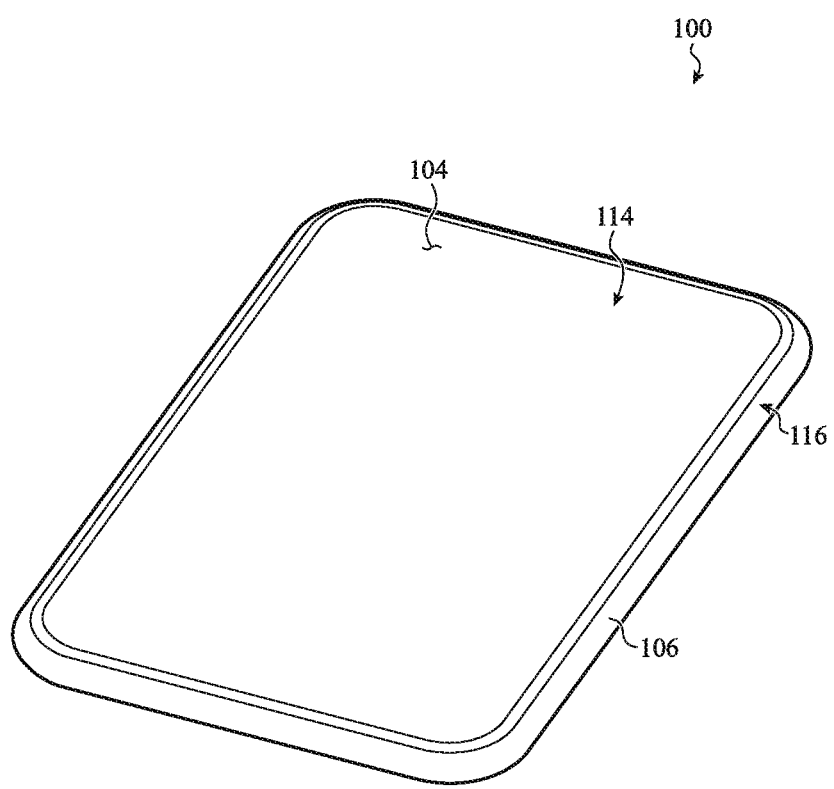
FIG. 1B shows a back view of an example electronic device.

FIG. 1B shows a rear view of the electronic device 100 having a rear surface 104. The side surface 106 is also shown. As shown in FIG. 1B, the rear surface 104 may be defined, at least in part, by an enclosure component 114.

In embodiments, an enclosure component, such as the enclosure component 112 and/or 114 may comprise, consist essentially of, or consist of a glass member, such as a sheet of glass (e.g., a flat glass sheet or a contoured or shaped glass sheet). For example, the enclosure component 112 may comprise a glass member which at least partially defines the textured region 120. Examples of glass members are shown in the more detailed views of FIGS. 3-10.

The textured region 120 may be formed into the glass member and/or may be formed on the glass member. Processes for forming a textured region of a glass member are described with respect to FIG. 11 and that description is generally applicable herein. In additional embodiments, the enclosure component 112 and/or 114 may comprise, consist essentially of, or consist of a glass ceramic or ceramic member and the textured region 120 may be formed into the glass ceramic or ceramic member.

In some cases an enclosure component (e.g., the enclosure component 112 and/or 114) may be formed from multiple layers that include one or more glass sheets, polymer sheets, glass ceramic sheets, ceramic sheets, and/or various coatings and layers. By the way of example, coatings may be organic (e.g., an organic polymer), inorganic (e.g., a metal or a ceramic), or combinations thereof. In embodiments, the enclosure components as described herein are thin, typically less than 5 mm in thickness, and more typically less than 3 mm in thickness. In some aspects, the enclosure component can be from about 0.1 mm to 2 mm in thickness, and more typically from 0.15 mm to 1 mm in thickness.

An outer layer of the enclosure component may be formed by a coating having hydrophobic and/or oleophobic properties. For example, the coating may comprise a fluorinated material, such as a fluorinated oligomer or polymer, to impart oleophobic and/or hydrophobic properties. For example, the contact angle of an oil on the coating may be greater than or equal to about 65 degrees or about 70 degrees. As an additional example, the contact angle of water on the coating may be greater than or equal to 90 degrees. The fluorinated material may comprise a linear (non-branched) fluorinated molecule such as a linear fluorinated oligomer or a linear fluorinated polymer. In embodiments, the coating of the fluorinated material has a thickness from 5 nm to 20 nm or from 10 nm to 50 nm. The coating may be bonded directly to the surface features or may be bonded to an intermediate adhesion layer which is bonded directly to the surface features. In addition or alternatively, the coating may also be provided over parts of the enclosure that aren't textured.

The enclosure 110 may further includes an additional enclosure component 116 and the side surface 106 may be defined, at least in part, by the enclosure component 116. For example, the enclosure component 116 may be a housing member. The enclosure component 112 and the enclosure component 114 may be coupled to the housing member using a fastener or fastening technique. For example, the front enclosure component 112 may be coupled to the housing member 116 using an adhesive, an engagement feature, a fastener, or a combination of any of these. As examples, the housing member 116 may include one or more metal members or one or more glass members. In one example, the side surface 106 is formed from a series of metal segments that are separated by polymer or dielectric segments that provide electrical isolation between adjacent metal segments. As additional examples, the side surface 106 may be defined by one or more glass members, glass ceramic members, or members including a glass and a glass ceramic.

In some embodiments, the electronic device 100 may be a mobile phone, a notebook computing device (e.g., a notebook), a tablet computing device (e.g., a tablet), a portable media player, a wearable device, or another type of portable electronic device. The electronic device 100 may also be a desktop computer system, computer component, input device, appliance, or virtually any other type of electronic product or device component.

Figure 2:
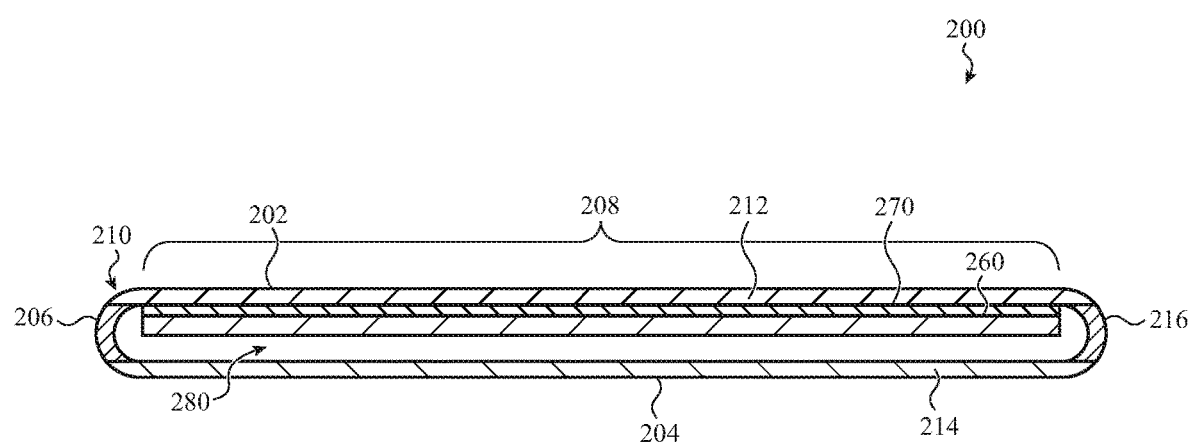
FIG. 2 shows a cross-sectional view of an electronic device.

FIG. 2 shows an example cross-section view of an electronic device 200. The electronic device 200 may be an example of the electronic device 100 (sectioned along A-A). As shown in FIG. 2, the enclosure 210 defines an internal volume 280 of the electronic device 200. The enclosure 210 includes an enclosure component 212 which defines, at least in part, the front surface 202 of the electronic device 200. As shown in FIG. 2, enclosure component 212 has the form of a front cover. The enclosure 210 also includes enclosure component 214 which defines, at least in part, the rear surface 204 of the electronic device 200. Housing component 216 defines, at least in part, the side surface 206 of the electronic device 200.

In embodiments, the enclosure 210 may at least partially surround and/or enclose a display 260 that is positioned at least partially within the internal volume 280. As shown in FIG. 2, the enclosure component 212 is positioned over the display 260. Display 260 is configured to produce a graphical output that is viewable through a transparent window region 208 of the enclosure 210 (and particularly, in the depicted example, the enclosure component 212). A touch sensitive layer 270 may also be positioned at least partially within internal volume 280. In some instances, the touch-sensitive layer 270 (e.g., a capacitive touch sensor or one or more components of a capacitive touch sensor) is attached to the enclosure component 212 and positioned between the enclosure component 212 and the display 260. The touch-sensitive layer 270 may define, along a surface of the enclosure 210, a touch-sensitive input surface. For example, the portion of the enclosure 210 that defines a transparent window region 208 that is positioned over a display 260 may also define the touch-sensitive input surface.

In embodiments, a display may be characterized by a size of the individual pixels of the display. In embodiments, a pixel size may be determined from the number of pixels per distance (e.g., pixels per inch) of the display. For example, the pixels of a display having 500 pixels per inch may have a pixel size of about 50 microns. In additional embodiments, a sensor, such as an image sensor, may also be characterized by a pixel size of the sensor.

At least a portion of the enclosure component 212, such as transparent window region 208, is transparent to light in the visible spectrum. In embodiments, a transparent window region 208 has transmittance greater than or equal to 70%, 80%, or 90% over the visible spectrum of light. The transmittance may be integrated over the visible spectrum. As previously discussed, the transparent window region 208 may have a dual-textured surface that provides both anti-reflective and anti-glare properties. For example, the transparent window region 208 may define first surface features and second surface features, with the first surface features configured to provide an anti-glare property and the second surface features configured to provide an anti-reflective property. The transparent window region 208 may be positioned over an active area of the display 260 so that a graphical output of the display is visible through the transparent window region 208. In some embodiments, an inactive area of the display is positioned outside the transparent window region 208.

The enclosure components 212 and 214 may define a portion or all of the internal volume or cavity 280 of the electronic device 200 that is configured to receive the various electronic components of the electronic device 200. The housing component 216 may further define a portion of the internal volume 280. A variety of electronic device components may be positioned within the enclosure 210. For example, the electronic device 200 may comprise one or more of a display, memory, a processor, control circuitry, a battery, an input device, an output device, a communication port, an accessory (e.g., a camera), and a sensor. Components of a sample electronic device are discussed in more detail below with respect to FIG. 13.

While some of the following embodiments are described with respect to an enclosure component including a glass member, such as a glass cover, the same or similar principles may be applied to any enclosure component that defines a portion of an external surface of a device. As previously described, an enclosure component may be formed from multiple layers that include one or more glass sheets, polymer sheets, glass ceramic sheets, ceramic sheets, and/or various coatings and layers.

FIG. 3 shows a detail view of a portion of a textured enclosure component 312. Enclosure component 312 may be an example of enclosure component 112 in detail area 1-1 of FIG. 1A. The textured region 320 of the textured enclosure component 312 includes two different types of surface features: first surface features 330 (e.g., 330a and 330b) and second surface features 340. The first surface features 330 typically have a size, such as a width, which is greater than that of the second surface features 340. In some cases the first surface features have a distribution of sizes, such as a width distribution.

The textured enclosure component 312 includes a textured glass member 352. The first surface features 330 (e.g., 330a, 330b) and second surface features 340 may be formed in and/or on the glass member 352 as shown in the cross-section views of FIGS. 4, 5A, and 5B. In some embodiments, the thickness of any surface coating on the textured glass member 352 is thin relative to the dimensions of at least the first surface features 330.

As shown in FIG. 3, the first surface features 330 may extend outwardly (or protrude) from the substrate surface 322. Each of the first surface features 330 defines a base that defines a polygonal contour and an inclined surface extending generally outward from the base and defining a side surface of the first surface feature 330 (the inclined surface 426 is shown in the cross-section view of FIG. 4). The first surface features 330 include at least a portion of a pyramid. As shown in FIG. 3, the inclined surface defines facets.

Figure 4:
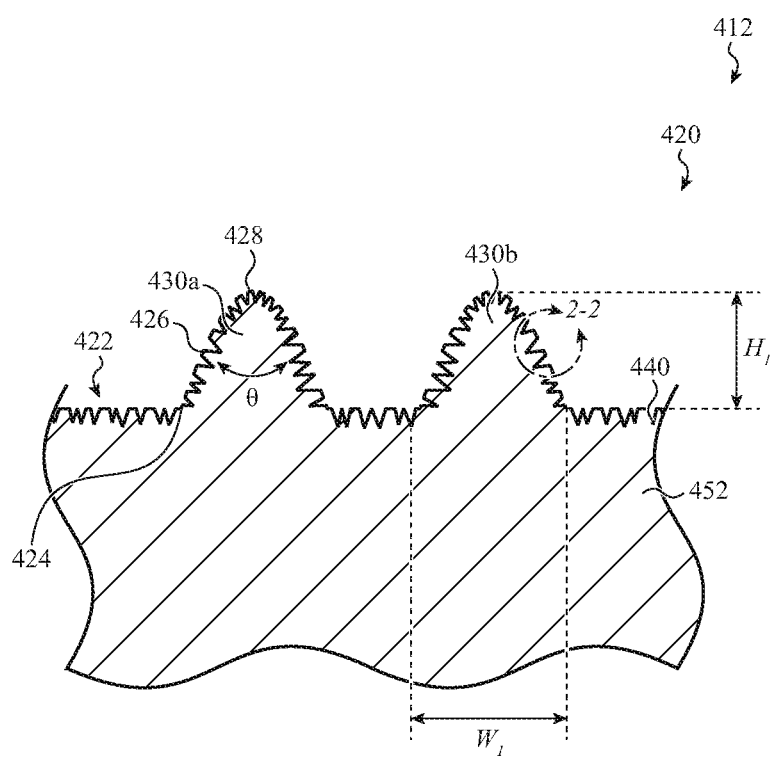
FIG. 4 shows a cross-section view of a textured enclosure component.
Figure 5A:
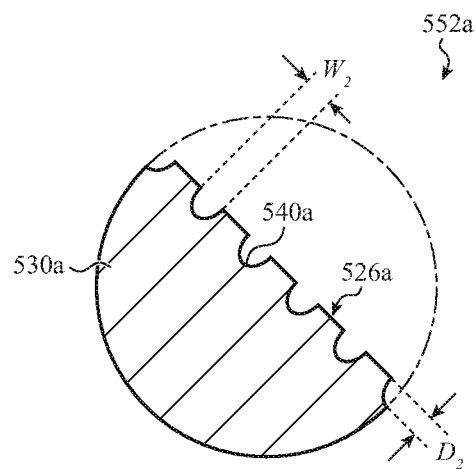
FIGS. 5A and 5B show detail views of an example textured enclosure component.
Figure 5B:
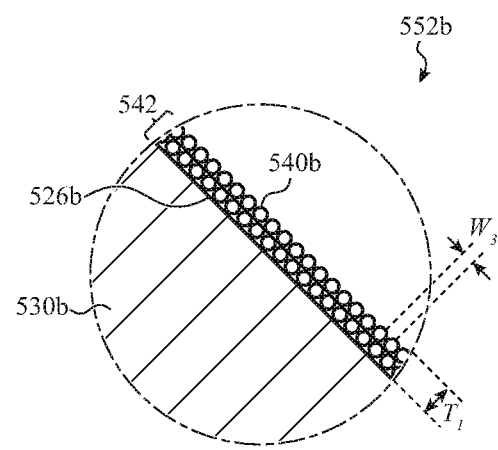

It should be appreciated, however, that the first surface features 330 may define any suitable surface contour and shape. For example, the first surface features 330 may define any of a range of shapes or configurations which can produce an anti-glare effect, such as by diffusing or scattering light reflected from the surface of the enclosure component. For example, the first surface features 330 may define a circular, oval, polygonal, rectangular, or irregular surface contour. Furthermore, first surface features 330 may define protrusions or recesses and may have any suitable shape and may be pyramidal, conical, cylindrical, arched, have a curved upper surface or a frustum of a shape such as a cone, and so on. Further, while the edges and inclined surfaces of the surface features 330 are depicted as having straight edges and planar surfaces, they may instead have discontinuities or other irregularities. Nevertheless, the edges and surfaces may be generally distinguishable or have distinctive features even if they are not exactly planar, straight, flat, or the like. More detailed views of examples of the first surface features 330 are shown in FIGS. 4 and 5A-5B.

In embodiments, at least two adjacent first surface features 330 are set apart from one another along the substrate surface 322 such that a span of the substrate surface 322 is exposed between the adjacent first surface features 330. The first surface features 330 on an enclosure component may have an average "pitch" (e.g., separation distance). As referred to herein, the pitch is the distance between the centers of two surface features, such as the first surface features 330. In some cases, adjacent first surface features may abut one another or even merge into one another. In other cases, the separation distance between two adjacent first surface features may be greater than the average pitch. Therefore, there may be a distribution of pitch values. In embodiments, the average pitch is micro-scale. As noted above, micro-scale may refer to sizes from about 1 micron to about 1 mm (typically less than 1 mm). For example, when the first surface features are protrusions, an average, mean, or median spacing of adjacent protrusions of a set of protrusions (e.g., the pitch of the features) may be from about 1 micron to about 20 microns. In some cases, the first surface features 330 are configured to prevent a user's finger from contacting the substrate surface 322 or otherwise to reduce the surface area of contact between the user's finger and the textured region of the enclosure component 312, such as under typical use conditions.

The second surface features 340 are schematically shown with stippling. These surface features may provide a different function or property than the first surface features 330, and as such have a different configuration (e.g., size, shape, etc.). For example, the second surface features 340 may be configured to provide an effective index of refraction (e.g., an index of refraction less than that of the material defining the second surface features 340) and therefore produce an anti-reflective effect. By providing both the first surface features 330 and the second surface features 340 in the same areas, and with the second surface features 340 on and between the first surface features 330, both anti-reflective and anti-glare properties may be achieved on a transparent surface. More detailed views of examples of the second surface features 340 are shown in FIGS. 4 and 5A-5B.

Adjacent second surface features 340 may also be set apart from each other. The second surface features 340 on an enclosure component may also have an average "pitch" (e.g., separation distance). In embodiments, the average pitch between the second surface features 340 is nano-scale. As noted above, nano-scale may refer to sizes from about 1 nm to about 1 micron (typically less than 1 micron).

FIG. 4 shows a cross-section view of a textured enclosure component 412. The textured enclosure component 412 may be an example of the textured enclosure component 312 of FIG. 3 (sectioned along B-B). The textured enclosure component 412 includes a textured glass member 452. The glass member 452 defines, in a textured region 420 of the glass member 452, a substrate surface 422 and first surface features 430 (e.g., 430a, 430b) in the form of protrusions that extend outwardly from the substrate surface 422. The textured region 420 further comprises second surface features 440 distributed over the first surface features 430 and the substrate surface 422. As shown in FIG. 4, the substrate surface 422 may define a plane between first surface features 430 (e.g., as defined by the portion of substrate surface 422 between the recesses 440).

As shown in FIG. 4, the first surface features 430 have a base 424 having a width $W_1$ (also referred to as a protrusion width), a peak 428 having a height $H_1$ (also referred to as a protrusion height) above the substrate surface 422, and an inclined surface 426 extending from the base 424 to the peak 428. As previously discussed, the first surface features 430 may have a micro-scale width, a width from about 750 nm to less than about 25 microns, greater than or equal to about 750 nm and less than about 10 microns, from about 1 micron to about 25 microns, from about 1 micron to about 10 microns, or from about 1 micron to about 5 microns. In addition, the first surface features 430 may have a width less than a pixel size of a display or a sensor underlying the enclosure component. As previously discussed, the first surface features 430 may be configured to diffuse or scatter reflected light.

The inclined surface 426 may define an obtuse angle with respect to substrate surface 422 (and an acute internal angle). The inclined surface 426 further defines an internal taper angle $\theta$ of the first surface features 430. As shown in FIG. 4, the internal taper angle $\theta$ is acute. More generally, the internal taper angle $\theta$ may be oblique, acute, right, or obtuse. By the way of example, the internal taper angle $\theta$ may be from about 60 degrees to about 180 degrees, from about 60 degrees to about 120 degrees, or from about 110 degrees to about 170 degrees.

As shown in FIG. 4, the inclined surface 426 defines a generally planar portion (e.g., as defined by the portion of inclined surface 426 between the recesses 440). It should be appreciated, however, that the inclined surface 426 may define any suitable shape, and may define a shape that is curved, rounded, multi-faceted, stepped (e.g., a given facet may include one or more steps), and the like. When the inclined surface is multi-faceted, the number of facets on any given inclined surfaces may differ.

As shown in FIG. 4, the second surface features 440 have the form of recesses. The recesses may be somewhat irregular in shape, as shown in FIG. 4, or may be generally regular in shape. For example, the second surface features 440 may be configured to provide an effective index of refraction (e.g., an index of refraction less than that of the material defining the second surface features 440) and therefore produce an anti-reflective effect. As previously discussed, the second surface features 440 may have a nano-scale surface width, a width from about 5 nm to about 200 nm, from about 5 nm to about 100 nm, from about 5 nm to about 50 nm, or from about 5 nm to about 25 nm.

FIG. 5A shows a detail view of a textured glass member 552a. The textured glass member 552a may be an example of the textured glass member 452 of FIG. 4. As shown in FIG. 5A, the second surface features 540a have the shape of recesses formed into the inclined surface 526a of the larger first surface feature 530a. In embodiments, the recesses may be characterized as having a width $W_2$ (also referred to as a recess width). Further the recesses may be characterized as having a depth $D_2$ (also referred to as a recess depth). In embodiments, recesses may be formed into the inclined surface 526a using an etching or an imprinting technique, as explained in further detail with respect to FIG. 11.

FIG. 5B a detail view of a textured glass member 552b. The textured glass member 552b may be an example of the textured glass member 452 of FIG. 4. FIG. 5B shows a further example of the second surface features 540b that may be formed along an inclined surface 526b of the larger first surface feature 530b. As shown in FIG. 5B, the second surface features 540b have the form of particles bonded to the inclined surface 526b. The particles may be characterized by a width $W_3$, which may be a diameter. As shown in FIG. 5B, the particles may form a layer 542 having a thickness $T_1$. In embodiments, particles such as silica particles may be bonded to the inclined surface 526b using a sol-gel technique, as explained in further detail with respect to FIG. 11.

Although FIGS. 5A and 5B show example shapes of the second surface features 540a and 540b, it should be appreciated that the second surface features may define any suitable shape. In embodiments, the second surface features may define recesses, projections, particles, or combinations thereof. In embodiments, the inclined surface has a roughness defined by the smaller surface features.

For example, the second surface features, such as 540a and 540b, may define any of a range of shapes or configurations which can produce an anti-reflective effect. For example, the second surface features 540a and 540b may be configured to provide an effective index of refraction (e.g., an index of refraction less than that of the material defining the second surface features 540a and 540b) and therefore produce an anti-reflective effect. As previously discussed, the second surface features (e.g., 540a and 540b) may have a nano-scale width (e.g., at an inclined surface or at a substrate surface), a width from about 5 nm to about 100 nm, from about 5 nm to about 50 nm, or from about 5 nm to about 25 nm.

FIG. 6 shows a detail view of a textured enclosure component 612. The enclosure component 612 may be another example of enclosure component 112 in detail area 1-1 of FIG. 1A. The textured region 620 of the enclosure component 612 includes first surface features 630 (e.g., 630a and 630b) and second surface features 640.

The textured enclosure component 612 includes a textured glass member 652. The first surface features 630 (e.g., 630a, 630b) and second surface features 640 may be formed in the glass member 652, as shown in the cross-section views of FIGS. 7-9, or on the glass member 652 as shown in FIG. 10.

The first surface features 630 may extend outwardly from the substrate surface 622. Each of the first surface features 630 has a base which defines a generally circular contour and an inclined surface extending generally outward from the base and defining a side surface of the first surface feature 630 (the inclined surface 726 is shown in the cross-section view of FIG. 7). In addition, the first surface features 630 include a portion of a cone. The first surface features 630 may be configured to diffuse or scatter light reflected from the surface of the enclosure component and therefore produce an anti-glare effect.

The second surface features 640, which are smaller than the first surface features 630, are schematically shown with stippling. These surface features may provide a different function than the first surface features 630, and as such have a different configuration (e.g., size, shape, etc.). For example, the second surface features 640 may be configured to provide an effective index of refraction (e.g., an index of refraction less than that of the material defining the second surface features 640) and therefore produce an anti-reflective effect.

Figure 7:
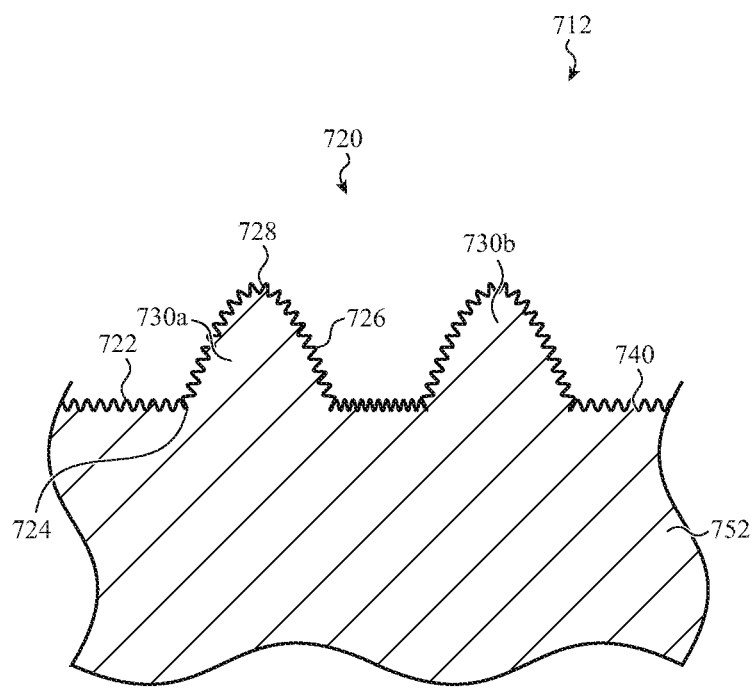
FIG. 7 shows an example cross-section view of a textured enclosure component.

FIG. 7 shows an example cross-section view of a textured enclosure component 712. The textured enclosure component 712 may be an example of the textured enclosure component 612 of FIG. 6 (sectioned along C-C). The textured enclosure component 712 includes a textured glass member 752.

The textured region 720 of the glass member 752 defines a substrate surface 722 and first surface features 730 (e.g., 730a, 730b) in the form of protrusions that extend outwardly from the substrate surface 722. The first surface features 730 define a base 724, a peak 728, and an inclined surface 726 which extends from the base 724 towards the peak 728. The first surface features 730 may be configured to diffuse or scatter light reflected from the surface of the enclosure component and therefore produce an anti-glare effect.

The textured region 720 further comprises second surface features 740 in the form of recesses distributed over the first surface features 730 and the substrate surface 722. As shown in FIG. 7, the second surface features 740 have the form of recesses and are generally regular in shape.

The second surface features 740 may be configured to provide an effective index of refraction (e.g., an index of refraction less than that of the material defining the second surface features 740) and therefore produce an anti-reflective effect. As previously discussed, the second surface features may have a nano-scale surface width.

Figure 8:
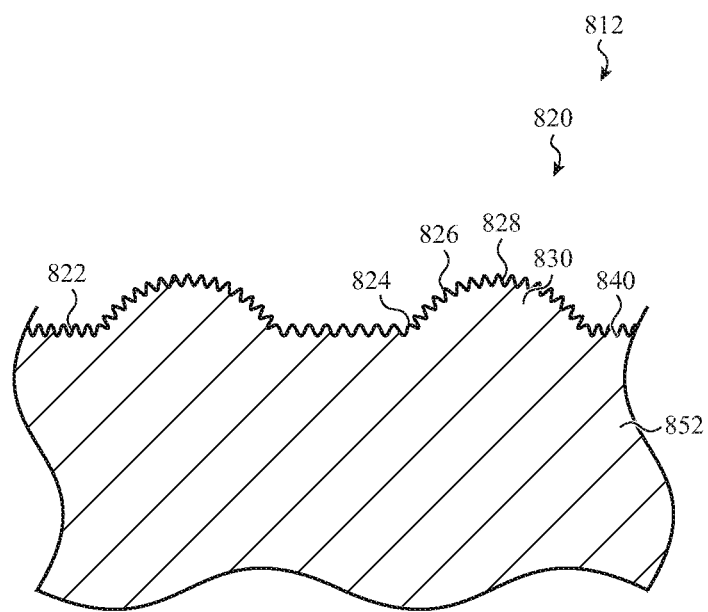
FIG. 8 shows a cross-section view of an additional example of a textured enclosure component.

FIG. 8 shows a cross-section view of an additional example of a textured enclosure component 812. The textured enclosure component 812 includes a textured glass member 852. The textured region 820 of the glass member 852 defines a substrate surface 822 and first surface features 830 in the form of protrusions which extend outwardly from the substrate surface 822. The first surface features 830 define a base 824, a top 828, and a curved surface 826 that extends from the base 824 towards the peak 828. The curved surface 826 has a convex shape. The textured glass member 852 further includes second surface features 840, which are smaller than first surface features 830 and may be shaped and sized as previously described with respect to FIGS. 3-7.

The first surface features 830 may be configured to diffuse or scatter light reflected from the surface of the enclosure component 812 and therefore produce an anti-glare effect. The second surface features 840 may be configured to provide an effective index of refraction (e.g., an index of refraction less than that of the material defining the second surface features 840) and therefore produce an anti-reflective effect.

Figure 9:
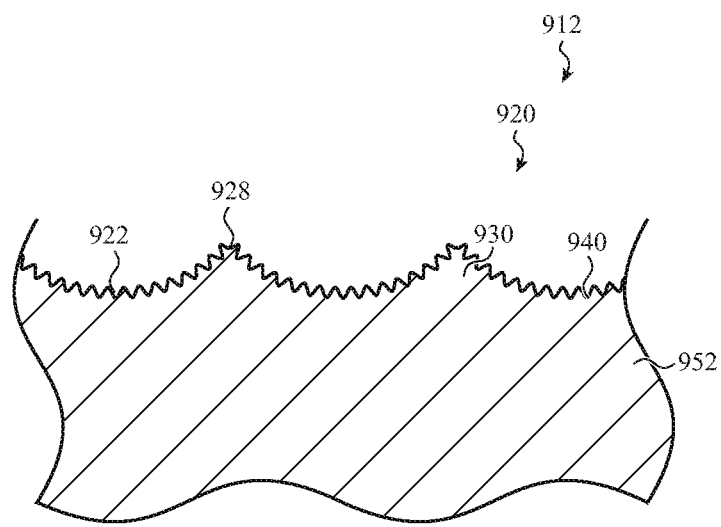
FIG. 9 shows a cross-section view of a further example of a textured enclosure component.
Figure 10:
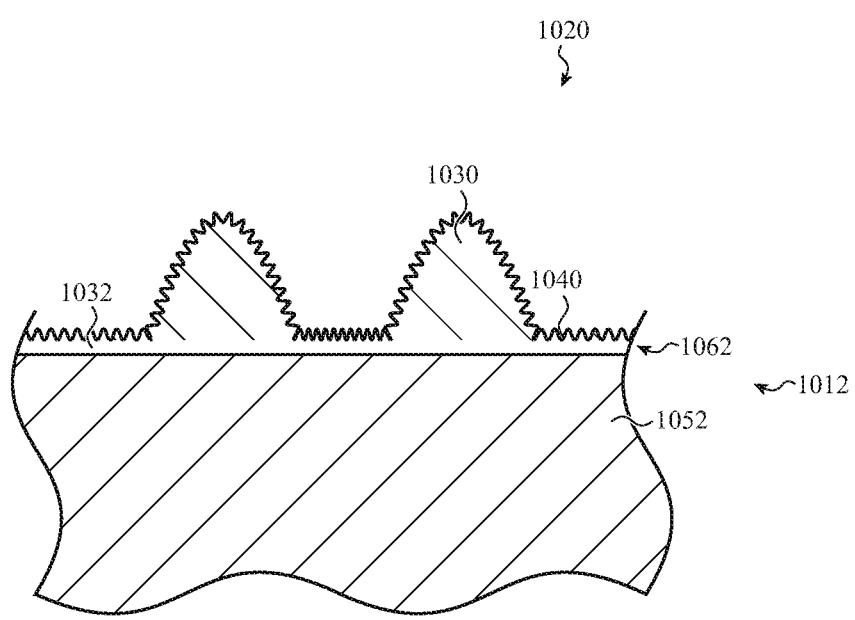
FIG. 10 shows a cross-section view of another example of a textured enclosure component.

FIG. 9 shows a cross-section view of a further example of a textured enclosure component 912. The textured enclosure component 912 includes a textured glass member 952. The textured region 920 of the glass member 952 defines first surface features 930 in the form of protrusions and surfaces 922 between the protrusions. Each of the first surface features 930 defines a top 928. In contrast to the shapes of FIG. 8, the tops 928 of adjacent first surface features 930 are joined by surface 922 that is curved and has a concave shape. Alternately, the surfaces 922 may be viewed as defining recesses. The textured glass member 952 further includes second surface features 940, which are smaller than first surface features 930 and may be shaped and sized as previously described with respect to FIGS. 3-7.

The first surface features 930 may be configured to diffuse or scatter light reflected from the surface of the enclosure component 912 and therefore produce an anti-glare effect. The second surface features 940 may be configured to provide an effective index of refraction (e.g., an index of refraction less than that of the material defining the second surface features 940) and therefore produce an anti-reflective effect.

FIG. 10 shows a cross-section view of another example of a textured enclosure component 1012. The enclosure component 1012 includes a glass member 1052 and a coating layer 1062, with the first surface features 1030 and second surface features 1040 formed into coating layer 1062. By the way of example, the coating layer 1062 may be formed via a sol-gel process and may comprise silica. In embodiments, the first surface features 1030 may be formed by shaping the coating layer 1062 as described with respect to operation 1102 of FIG. 11. The second surface features 1040 may be formed as described with respect to operation 1104 of FIG. 11. A portion 1032 of the coating layer 1062 may be present between adjacent first surface features 1030.

The first surface features 1030 may be configured to diffuse or scatter light reflected from the surface of the enclosure component 1012 and therefore produce an anti-glare effect. The second surface features 1040 may be configured to provide an effective index of refraction (e.g., an index of refraction less than that of the material defining the second surface features 1040) and therefore produce an anti-reflective effect.

In additional aspects, the disclosure provides processes for making textured enclosure components for electronic devices, in particular dual-textured enclosure components. In embodiments, the processes include an operation of forming a first texture including first surface features and an operation of forming a second texture including a second surface features. As previously described, the first surface features may have a size, such as a width, larger than the second surface features. For example, the first texture may be a micro-scale texture and the second texture may be a nano-scale texture.

As previously described, the first surface features of the first texture may be configured to diffuse or scatter light reflected from the surface of the enclosure component and therefore produce an anti-glare effect. The second surface features of the second texture may be configured to provide an effective index of refraction (e.g., an index of refraction less than that of the material defining the second surface features) and therefore produce an anti-reflective effect.

Figure 11:
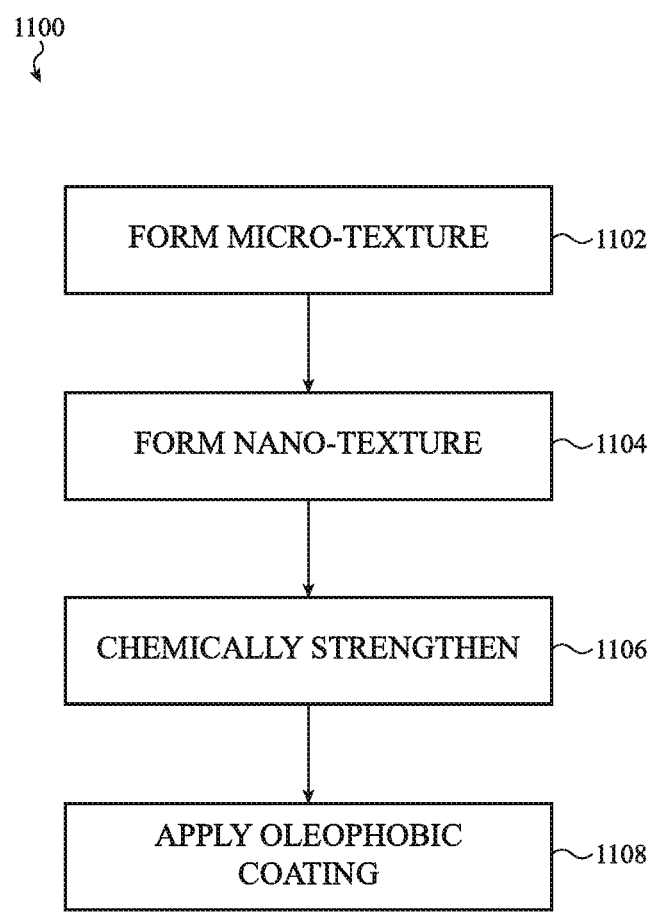
FIG. 11 shows a flow chart of a process for making a textured enclosure component for an electronic device.

FIG. 11 shows a flow chart of a process 1100 for making a textured enclosure component for an electronic device. In embodiments, an enclosure component may comprise a glass material, a glass ceramic material, or combinations thereof. For example, the enclosure component may comprise a glass member or a glass ceramic member. Further, the enclosure component may be formed from one or more glass sheets, polymer sheets, glass ceramic sheets, ceramic sheets, and/or various coatings and layers.

In embodiments, the glass material and/or glass ceramic material is ion-exchangeable. Ion-exchangeable glasses include, but are not limited to, soda lime glasses, alumino-silicate glasses, and aluminoboro silicate glasses.

As shown in FIG. 11, the process 1100 comprises an operation 1102 of forming a micro-scale texture (or micro-texture) along a surface of an enclosure component. For example, the micro-scale texture may be formed along an exterior surface of the enclosure component. The micro-scale texture may be formed in and/or on an exterior surface of a glass member of the enclosure component as schematically illustrated in FIGS. 12A-12D.

The micro-texture may include first surface features having a size from 1 micron to less than 1 mm. For example, the first surface features may have a micro-scale width (e.g., as measured between the two furthest points of a base of the feature), and/or a micro-scale height (measured from a substrate surface to a peak of the feature). The first surface features may have a width from about 750 nm to less than about 25 microns, greater than or equal to about 750 nm and less than about 10 microns, from about 1 micron to about 25 microns, from about 1 micron to about 10 microns, or from about 1 micron to about 5 microns. The first surface features may have a height from about 200 nm to about 2 microns, from about 200 nm to about 1 micron, or from about 500 nm to about 5 microns. The first surface features may also be characterized by an average "pitch" (e.g., separation distance). In some cases, the average pitch is micro-scale, such as from about 1 micron to about 25 microns, microns from about 1 micron to about 20 microns, from about 1 micron to about 10 microns, or from about 1 micron to about 5. In further embodiments, each of the first surface features has a width less than a pixel size of a display or a sensor underlying the cover to limit distortion of the pixels as viewed through the enclosure component.

The first surface features may define any of a range of shapes or configurations which can produce an anti-glare effect, such as by diffusing or scattering light reflected from the surface of the enclosure component. The first surface features may have any of the shapes described with respect to FIGS. 3-10. As previously described, the micro-scale features may protrude outward or be recessed inward from a substrate surface.

Figure 12A:
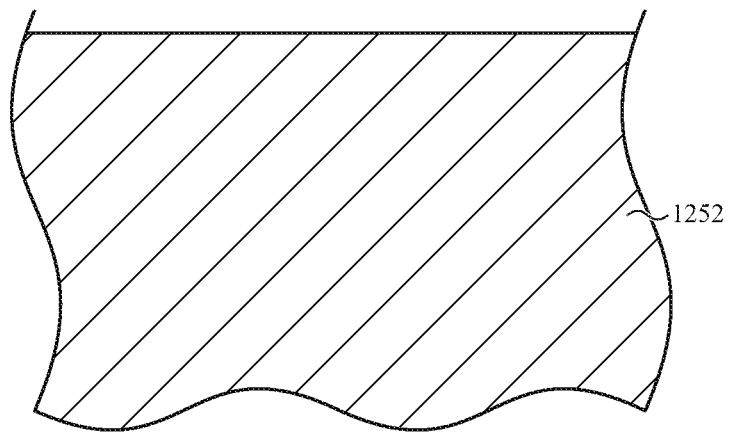
FIGS. 12A, 12B, 12C, and 12D show various stages in the process of making a textured enclosure component.
Figure 12B:
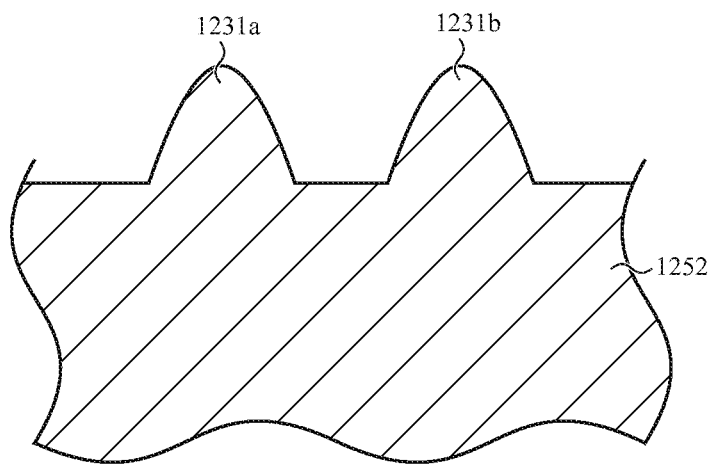

In embodiments, the operation 1102 comprises removing a portion of the enclosure component. The operation 1102 may comprise removing a portion of a member, such as a glass member, of the enclosure component (as illustrated by FIGS. 12A-12B). Techniques for removing material include, but are not limited to, chemical etching, laser ablation, mechanical removal of material, mechanical pre-treatment followed by etching, lithography in combination with etching, and so on. Chemical etching techniques for glass members may involve using an acid to remove portions of the glass member; acid etching may occur in the liquid phase or in a gas phase. As examples, the acid may comprise hydrofluoric acid, hydrochloric acid, phosphoric acid, nitric acid, sulfuric acid, and the like. Etching techniques also include reactive ion etching, which may use a mixture of a fluorine containing compound such as $CH_4$, $CHF_3$, $SF_6$ and the like in a gas such as argon or xenon. Reactive ion etching may be combined with lithography. When operation 1102 comprises removing a portion of the enclosure component, the surface features formed by operation 1102 typically comprise the same material as the glass structure, so that the glass portion of the enclosure component is formed of a single glass material.

In additional embodiments, the operation 1102 comprises adding material to an enclosure component. The operation 1102 may comprise adding material to a member of the enclosure component. In embodiments, a sol-gel technique can be used to form surface features, such as silica-containing features, on a glass member. For example, a layer or region(s) of a sol or an at least partially gelled sol (sol-gel) may be deposited on a surface of the glass member. Deposition techniques include, but are not limited to, spin, spray, and dip coating. A gel may then be formed in the layer or region(s) of the sol/sol-gel. The gelled product may be dried, sintered, calcined, and combinations thereof.

When the operation 1102 comprises adding material to the enclosure component, the surface features formed typically comprise a different material from the glass member. For example, sol-gel techniques may be used to form a variety of materials including silicon oxides (e.g., silica), metal oxides such as titanium oxides or zirconium oxides and combinations of these. In embodiments, the sol may be formed, at least in part, by hydrolysis of precursor such as a silicon alkoxide or a metal alkoxide.

A variety of material structures may be formed via sol-gel techniques. For example, a material formed via a sol-gel technique may have a porous structure, a dense structure, or a structure comprising an assembly of particles. The structure of the material may depend, at least in part, on the structure of the gel formed from the sol via condensation. For example, the gel may be colloidal (including particles), polymeric, or a combination thereof. The particles may have a nano-scale diameter. The gel may also include structure directing agents. Further, imprinting and/or thermal treatment of the gel (such as drying, sintering, and the like) may be used to direct the structure of the gel.

As shown in FIG. 11, the process 1100 further comprises an operation 1104 of forming a nano-scale texture (nano-texture) along a surface of the enclosure component. The nano-scale texture may be formed in and/or on an exterior surface of a glass member of the enclosure component as schematically illustrated in FIGS. 12A-12D.

The nano-texture may include second surface features having a size from about 1 nm to about 1 micron, and typically less than 1 micron. For example, the second surface features may have a nano-scale width (e.g., as measured between the two furthest points of a base of a projection feature or an opening of a recess). The second surface features may have a width from about 5 nm to about 200 nm, from about 5 nm to about 100 nm, from about 5 nm to about 50 nm, or from about 5 nm to about 25 nm. The second surface features may have a depth from about 5 nm to about 100 nm, from about 5 nm to about 50 nm, or from about 5 nm to about 25 nm. The second surface features may also be characterized by an average pitch. Typically, the average pitch is nano-scale.

For example, the second surface features may be configured to provide an effective index of refraction (e.g., an index of refraction less than that of the material defining the second surface features) and therefore produce an anti-reflective effect. By providing both the first surface features and the second surface features in the same areas, and with the second surface features on and between the first surface features, both anti-reflective and anti-glare properties may be achieved on the enclosure surface.

In embodiments, the second surface features may be formed by removal of material or by addition of material as previously described for the operation 1102. However, the removal or additional material typically occurs to a lesser extent than during the operation 1104. Although the operation 1104 typically follows the operation 1102, in some embodiments, the operation 1102 and the operation 1104 may occur concurrently (e.g., via an imprinting process).

As shown in FIG. 11, the process 1100 further comprises an operation 1106 of chemically strengthening the electronic component. In additional embodiments, the operation 1106 is optional. In embodiments, a glass member of the electronic component is chemically strengthened by ion exchange. As an example, ions present in the glass are exchanged for larger ions in an ion-exchange bath to form a compressive stress layer extending from a surface of the glass structure. For example, an ion-exchangeable glass material may include monovalent or divalent ions such as alkali metal ions (e.g., Li+, Na+, or K+) or alkaline earth ions (e.g., Ca2+ or Mg2+) which may be exchanged for other alkali metal or alkaline earth ions. If the glass member comprises sodium ions, the sodium ions may be exchanged for potassium ions. Similarly, if the glass member comprises lithium ions, the lithium ions may be exchanged for sodium ions and/or potassium ions. In embodiments, the compressive stress layer extends at least partially into the surface features.

As shown in FIG. 11, the process 1100 further includes an operation 1108 of applying a coating, such as a hydrophobic and/or oleophobic coating, to the surface features. The coating may provide resistance to oils and other deposits on the electronic component. For example, the material may comprise a fluorinated material, such as a fluorinated oligomer or polymer, to impart oleophobic and/or hydrophobic properties. For example, the contact angle of an oil on the coating may be greater than or equal to about 65 degrees or about 70 degrees. As an additional example, the contact angle of water on the coating may be greater than or equal to 90 degrees. The fluorinated material may comprise a linear (non-branched) fluorinated molecule such as a linear fluorinated oligomer or a linear fluorinated polymer.

For example, a coating comprising a fluorinated material may be applied to the features of both the micro-texture and the nano-texture. If present, the substrate surface may also be coated. In embodiments, the layer of the fluorinated material is from about 5 nm to about 20 nm or from about 10 nm to about 50 nm thick. The layer of the fluorinated material may be bonded directly to the surface features or may be bonded to an intermediate adhesion layer. The layer of the fluorinated material may be thin relative to at least one dimension of the surface features.

FIGS. 12A, 12B, 12C, and 12D show various stages in the process for making a textured enclosure component 1212. FIG. 12A shows a glass member 1252 of the enclosure component 1212 prior to any operations of the process. Although the glass member 1252 is shown in FIG. 12A as being substantially planar, the principles described herein also relate to members of enclosure components including one or more curved surfaces. In embodiments, the member and the enclosure component may be three-dimensional. For example, the member and the enclosure component may define a peripheral portion that is not coplanar with respect to a central portion. The peripheral portion may, for example, define a side wall of a device housing or enclosure, while the central portion defines a front surface (which may define a transparent window that overlies a display).

FIG. 12B shows the glass member 1252 after a first set of features 1231 (e.g., 1231a, 1231b) have been formed into the glass member 1252. The first set of features may form a first texture, such as a micro-texture. The first set of features may be formed by removing material from the glass member 1252 as shown in FIG. 12B or by adding material as previously described with respect to the operation 1102 of FIG. 11.

Figure 12C:
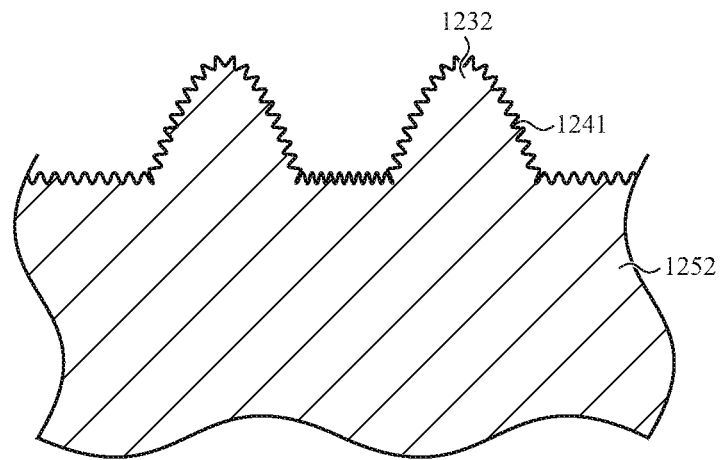

FIG. 12C shows the glass member 1252 after a second set of features 1241 have been formed along the first set of features 1231 (e.g., 1231a, 1231b) of FIG. 12B. Formation of the second set of features 1241 generally modifies the first set of features 1231 (e.g., 1231a, 1231b) as indicated by a modified first set of features 1232 in FIG. 12C. The second set of features 1241 may form a second texture, such as a nano-texture. The second set of features 1241 may be formed as previously described with respect to the operation 1104 of FIG. 11.

Figure 12D:
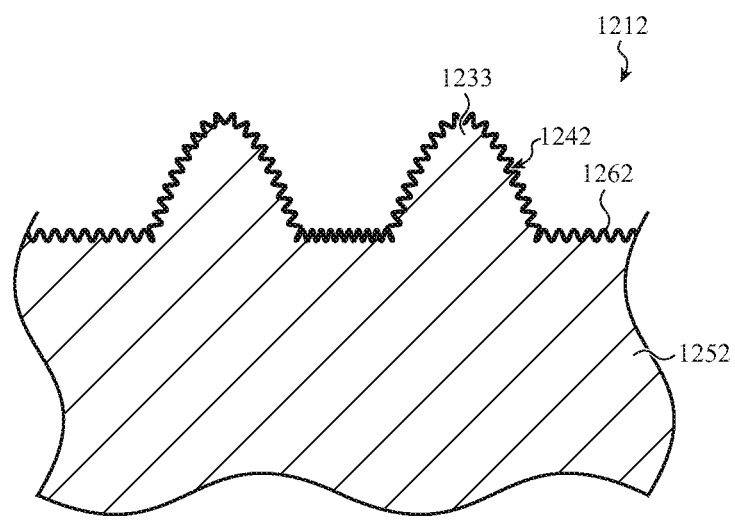

FIG. 12D shows enclosure component 1212 after an oleophobic coating 1262 has been applied over the first set of features 1232 and the second set of features 1241 of FIG. 12C. The resulting texture includes a first set of coated features 1233 and a second set of coated features 1242. The oleophobic coating may be applied as previously described with respect to the operation 1108 of FIG. 11.

Figure 13:
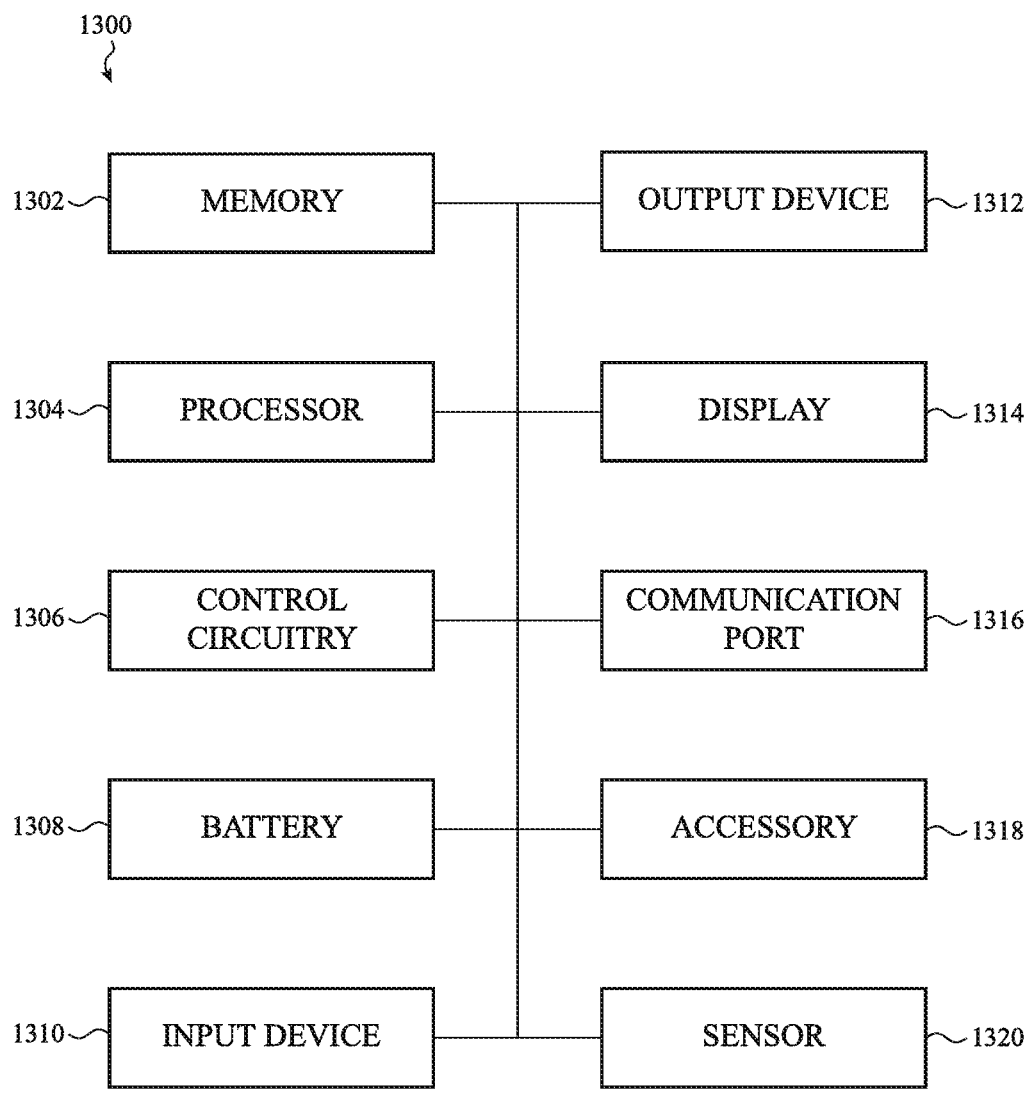
FIG. 13 shows a block diagram of a sample electronic device that can incorporate a textured enclosure component.

FIG. 13 is a block diagram of example components of an example electronic device. The schematic representation depicted in FIG. 13 may correspond to components of the devices depicted in FIG. 1A-12D as described above. However, FIG. 13 may also more generally represent other types of electronic devices with a textured enclosure component as described herein.

In embodiments, an electronic device 1300 may include sensors 1320 to provide information regarding configuration and/or orientation of the electronic device in order to control the output of the display. For example, a portion of the display 1314 may be turned off, disabled, or put in a low energy state when all or part of the viewable area of the display 1314 is blocked or substantially obscured. As another example, the display 1314 may be adapted to rotate the display of graphical output based on changes in orientation of the device 1300 (e.g., 90 degrees or 180 degrees) in response to the device 1300 being rotated. As another example, the display 1314 may be adapted to rotate the display of graphical output in response to the device 1300 being folded or partially folded, which may result in a change in the aspect ratio or a preferred viewing angle of the viewable area of the display 1314.

The electronic device 1300 also includes a processor 1304 operably connected with a computer-readable memory 1302. The processor 1304 may be operatively connected to the memory 1302 component via an electronic bus or bridge. The processor 1304 may be implemented as one or more computer processors or microcontrollers configured to perform operations in response to computer-readable instructions. The processor 1304 may include a central processing unit (CPU) of the device 1300. Additionally, and/or alternatively, the processor 1304 may include other electronic circuitry within the device 1300 including application specific integrated chips (ASIC) and other microcontroller devices. The processor 1304 may be configured to perform functionality described in the examples above. In addition, the processor or other electronic circuitry within the device may be provided on or coupled to a flexible circuit board in order to accommodate folding or bending of the electronic device.

The memory 1302 may include a variety of types of non-transitory computer-readable storage media, including, for example, read access memory (RAM), read-only memory (ROM), erasable programmable memory (e.g., EPROM and EEPROM), or flash memory. The memory 1302 is configured to store computer-readable instructions, sensor values, and other persistent software elements.

The electronic device 1300 may include control circuitry 1306. The control circuitry 1306 may be implemented in a single control unit and not necessarily as distinct electrical circuit elements. As used herein, "control unit" will be used synonymously with "control circuitry." The control circuitry 1306 may receive signals from the processor 1304 or from other elements of the electronic device 1300.

As shown in FIG. 13, the electronic device 1300 includes a battery 1308 that is configured to provide electrical power to the components of the electronic device 1300. The battery 1308 may include one or more power storage cells that are linked together to provide an internal supply of electrical power. The battery 1308 may be operatively coupled to power management circuitry that is configured to provide appropriate voltage and power levels for individual components or groups of components within the electronic device 1300. The battery 1308, via power management circuitry, may be configured to receive power from an external source, such as an alternating current power outlet. The battery 1308 may store received power so that the electronic device 1300 may operate without connection to an external power source for an extended period of time, which may range from several hours to several days. The battery 1308 may be flexible to accommodate bending or flexing of the electronic device.

In some embodiments, the electronic device 1300 includes one or more input devices 1310. The input device 1310 is a device that is configured to receive input from a user or the environment. The input device 1310 may include, for example, a push button, a touch-activated button, capacitive touch sensor, a touch screen (e.g., a touch-sensitive display or a force-sensitive display), capacitive touch button, dial, crown, or the like. In some embodiments, the input device 1310 may provide a dedicated or primary function, including, for example, a power button, volume buttons, home buttons, scroll wheels, and camera buttons.

The device 1300 may also include one or more sensors 1320, such as a force sensor, a capacitive sensor, an accelerometer, a barometer, a gyroscope, a proximity sensor, a light sensor, or the like. The sensors 1320 may be operably coupled to processing circuitry. In some embodiments, the sensors 1320 may detect deformation and/or changes in configuration of the electronic device and be operably coupled to processing circuitry which controls the display based on the sensor signals. In some implementations, output from the sensors 1320 is used to reconfigure the display output to correspond to an orientation or folded/unfolded configuration or state of the device. Example sensors 1320 for this purpose include accelerometers, gyroscopes, magnetometers, and other similar types of position/orientation sensing devices. In addition, the sensors 1320 may include a microphone, acoustic sensor, light sensor, optical facial recognition sensor, or other types of sensing device.

In some embodiments, the electronic device 1300 includes one or more output devices 1312 configured to provide output to a user. The output device 1312 may include display 1314 that renders visual information generated by the processor 1304. The output device 1312 may also include one or more speakers to provide audio output. The output device 1312 may also include one or more haptic devices that are configured to produce a haptic or tactile output along an exterior surface of the device 1300.

The display 1314 may include a liquid-crystal display (LCD), light-emitting diode, organic light-emitting diode (OLED) display, an active layer organic light-emitting diode (AMOLED) display, organic electroluminescent (EL) display, electrophoretic ink display, or the like. If the display 1314 is a liquid-crystal display or an electrophoretic ink display, the display 1314 may also include a backlight component that can be controlled to provide variable levels of display brightness. If the display 1314 is an organic light-emitting diode or organic electroluminescent-type display, the brightness of the display 1314 may be controlled by modifying the electrical signals that are provided to display elements. In addition, information regarding configuration and/or orientation of the electronic device may be used to control the output of the display as described with respect to input devices 1310. In some cases, the display is integrated with a touch and/or force sensor in order to detect touches and/or forces applied along an exterior surface of the device 1300.

The electronic device 1300 may also include a communication port 1316 that is configured to transmit and/or receive signals or electrical communication from an external or separate device. The communication port 1316 may be configured to couple to an external device via a cable, adaptor, or other type of electrical connector. In some embodiments, the communication port 1316 may be used to couple the electronic device to a host computer.

The electronic device 1300 may also include at least one accessory 1318, such as a camera, a flash for the camera, or other such device. The camera may be connected to other parts of the electronic device 1300 such as the control circuitry 1306.

The following discussion applies to the electronic devices described herein to the extent that these devices may be used to obtain personally identifiable information data. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

As used herein, use of the term "about" in reference to the endpoint of a range may signify a variation of +/−5%, +/−2%, or +/−1% of the endpoint value. In addition, disclosure of a range in which at least one endpoint is described as being "about" a specified value includes disclosure of the range in which the endpoint is equal to the specified value.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

What is claimed is:

1. An electronic device comprising:
 a housing member at least partially defining an internal volume of the electronic device;
 a display at least partially within the internal volume;
 a touch sensor at least partially within the internal volume; and
 a cover formed of a glass and coupled to the housing member, the cover defining, in an area positioned over the display:
  a first set of micro-scale features formed of the glass, the first set of micro-scale features comprising protrusions having an average height from about 500 nm to about 2 microns; and
  a second set of nano-scale features formed into the first set of micro-scale features, the second set of nano-scale features comprising recesses having an average depth from about 5 nm to about 100 nm, the second set of nano-scale features and the first set of micro-scale features at least partially defining a glass surface.

2. The electronic device of claim 1, wherein:
 the first set of micro-scale features is configured to provide an anti-glare property to the cover; and
 the second set of nano-scale features is configured to provide an anti-reflective property to the cover.

3. The electronic device of claim 2, wherein the cover has a transmittance greater than 80% over the visible spectrum of light.

4. The electronic device of claim 1, wherein:
 the cover defines a transparent region positioned over the display;
 the display comprises pixels having a pixel size; and
 each micro-scale feature of the first set of micro-scale features has a width less than the pixel size.

5. The electronic device of claim 1, wherein:
 each protrusion of the first set of micro-scale features defines a base, a peak, and an inclined surface from the base to the peak; and
 the inclined surface has a roughness defined by the second set of nano-scale features.

6. The electronic device of claim 5, wherein the inclined surface defines an internal taper angle from about 90 degrees to about 120 degrees.

7. The electronic device of claim 1, further comprising a hydrophobic coating on the glass surface and on at least a portion of the protrusions and the recesses.

8. An electronic device comprising:
 a housing member;
 a cover member coupled to the housing member, the cover member formed of a glass and defining, in a textured region of the cover member:
  a substrate surface;
  a set of protrusions formed of the glass and extending outwardly from the substrate surface, each protrusion of the set of protrusions having a protrusion width greater than or equal to about 750 nm and less than about 10 microns; and
  a set of recesses formed into the set of protrusions and the substrate surface, each recess of the set of recesses having a recess width from about 5 nm to about 200 nm; and
 a display coupled to the cover member and configured to display graphical outputs that are visible through the textured region of the cover member.

9. The electronic device of claim 8, wherein the set of protrusions is configured to prevent a user's finger from contacting the substrate surface.

10. The electronic device of claim 8, wherein:
 at least two adjacent protrusions of the set of protrusions are set apart from one another along the substrate surface; and
 an average spacing of the at least two adjacent protrusions of the set of protrusions is from about 1 micron to about 20 microns.

11. The electronic device of claim 8, wherein each recess of the set of recesses has a recess depth from about 5 nm to about 200 nm.

12. The electronic device of claim 8, further comprising an oleophobic coating on at least a portion of the set of protrusions and the set of recesses.

13. The electronic device of claim 8, wherein the cover member is formed of a single glass material.

14. The electronic device of claim 8, wherein the textured region of the cover member has a transmittance greater than 70% over the visible spectrum of light.

15. The electronic device of claim 12, wherein the oleophobic coating comprises a fluorinated material.

16. A mobile phone comprising:
 a display; and
 an enclosure at least partially surrounding the display, having an exterior surface, and comprising a cover member formed of a glass and defining, along the exterior surface:
  a set of micro-scale protrusions formed of the glass and extending from a substrate surface of the cover member, each micro-scale protrusion of the set of micro-scale protrusions defining:
a base having a width;
a peak having a height above the substrate surface; and
an inclined surface extending from the base to the peak; and nano-scale recesses distributed along and formed into the inclined surface of each micro-scale protrusion of the set of micro-scale protrusions, the nano-scale recesses, the inclined surfaces, and the substrate surface each defining at least a portion of a glass surface of the cover member.

17. The mobile phone of claim 16, wherein:
each micro-scale protrusion of the set of micro-scale protrusions has a width from about 1 micron to about 10 microns; and
each of the nano-scale recesses has a width from about 5 nm to about 100 nm.

18. The mobile phone of claim 16, wherein an average height of the set of micro-scale protrusions is from about 500 nm to about 5 microns.

19. The mobile phone of claim 16, wherein the inclined surface defines a convex shape.

20. The mobile phone of claim 16, wherein the exterior surface of the enclosure defines a touch-sensitive input surface.

* * * * *